United States Patent
Wu et al.

(10) Patent No.: US 9,587,383 B2
(45) Date of Patent: *Mar. 7, 2017

(54) PILOT VALVE SWITCH MECHANISM AND A COMBINED SHOWER APPLIED WITH THE PILOT VALVE SWITCH MECHANISM

(71) Applicants: XIAMEN SOLEX HIGH-TECH INDUSTRIES CO., LTD., Xiamen, Fujian (CN); Huasong Zhou, Xiamen, Fujian (CN)

(72) Inventors: Yulin Wu, Xiamen (CN); Mingfu Zhang, Xiamen (CN); Yuehua Qiu, Xiamen (CN); Huasong Zhou, Xiamen (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 59 days.

This patent is subject to a terminal disclaimer.

(21) Appl. No.: 14/151,135

(22) Filed: Jan. 9, 2014

(65) Prior Publication Data

US 2015/0090812 A1    Apr. 2, 2015

(30) Foreign Application Priority Data

Sep. 30, 2013  (CN) .......................... 2013 1 0463810

(51) Int. Cl.
*E03C 1/04*  (2006.01)
*F16K 11/07*  (2006.01)
(Continued)

(52) U.S. Cl.
CPC .......... *E03C 1/0409* (2013.01); *B05B 1/1663* (2013.01); *B05B 1/18* (2013.01); *F16K 11/0712* (2013.01); *Y10T 137/86582* (2015.04)

(58) Field of Classification Search
CPC ... B05B 1/1618; B05B 1/1627; B05B 1/1663; B05B 1/1681; B05B 1/18;
(Continued)

(56) References Cited

U.S. PATENT DOCUMENTS

4,616,671 A  * 10/1986  Steinkuhl et al. ............ 137/101
6,371,150 B1 *  4/2002  Shimada .................. 137/119.03
(Continued)

*Primary Examiner* — Arthur O Hall
*Assistant Examiner* — Cody Lieuwen
(74) *Attorney, Agent, or Firm* — Rabin & Berdo, P.C.

(57) ABSTRACT

A pilot valve switch mechanism and combined shower applied with the pilot valve switch mechanism includes a fixed portion and a valve spool. The fixed portion includes an inlet waterway, a first outlet waterway, a second outlet waterway and a control hole capable to connect to the outlet waterways. The first outlet waterway has a first outlet. The second outlet waterway has a second outlet. The valve spool is slidably assembled inside the fixed portion along the inlet waterway, with a slim hole connected to the inlet waterway. The valve spool and the fixed portion form a pressure cavity, which is connected to the control hole and the slim hole. The control hole controls the water pressure of the pressure cavity to drive the valve spool to close the first or second outlet, connecting the inlet waterway to the first or second outlet waterway. The control hole switches the waterways.

9 Claims, 7 Drawing Sheets

(51) Int. Cl.
 *B05B 1/18* (2006.01)
 *B05B 1/16* (2006.01)
(58) Field of Classification Search
 CPC ..... B05B 1/185; B05B 12/002; E03C 1/0408; E03C 1/0409; F16K 11/0712; F16K 11/0716
 USPC ....... 239/442, 443, 447, 541, 548, 569, 570; 137/118.02, 118.06, 119.01, 119.08, 489, 137/491; 251/25
 See application file for complete search history.

(56) References Cited

U.S. PATENT DOCUMENTS

| | | | |
|---|---|---|---|
| 7,784,494 B2* | 8/2010 | Matsuzaki et al. | 137/625.69 |
| 2006/0138253 A1* | 6/2006 | Petrovic et al. | 239/446 |
| 2012/0012676 A1* | 1/2012 | Hu | 239/525 |
| 2012/0145252 A1* | 6/2012 | Hunnicutt | 137/14 |
| 2012/0145810 A1* | 6/2012 | Zhou et al. | 239/443 |
| 2012/0205565 A1* | 8/2012 | Balmonet et al. | 251/25 |
| 2013/0291298 A1* | 11/2013 | Zhou et al. | 4/601 |

\* cited by examiner

PILOT VALVE SWITCH MECHANISM AND A COMBINED SHOWER APPLIED WITH THE PILOT VALVE SWITCH MECHANISM

FIELD OF THE INVENTION

The present invention relates to a pilot valve switch mechanism and a combined shower applied with the pilot valve switch mechanism.

BACKGROUND OF THE INVENTION

The switch valve of a handle shower and a head shower in existing technology is usually applied with a method that the switch is realized by rotating a sealing element to plug the outlet hole, the water pressure is directly working to the sealing element, so that user has to operate hard, thus making it with bad switch handle.

SUMMARY OF THE INVENTION

The present invention is provided with a pilot valve switch mechanism and a combined shower applied with the pilot valve switch mechanism, which overcome the disadvantages of the existing technology.

A first technical proposal of the present invention to solve the technical problem is as below:

A pilot valve switch mechanism comprising:

a fixed portion, which is disposed with an inlet waterway (10), a first outlet waterway (20), a second outlet waterway (30) and a control hole (40) capable to connect to the outlet waterways (20, 30), the first outlet waterway (20) is disposed with a first outlet (21), the second outlet waterway (30) is disposed with a second outlet (31);

a valve spool (100) is slidably assembled inside the fixed portion along the inlet waterway (10), the valve spool (100) is disposed with a slim hole (110) connected to the inlet waterway (10), the valve spool (100) and the fixed portion form a pressure cavity (50), the control hole (40) and the slim hole (110) are connected to the pressure cavity (50);

by opening or closing the control hole (40), the water pressure of the pressure cavity (50) is controlled to drive the valve spool (100) to move along the inlet waterway (10) to alternately close the first outlet (21) or the second outlet (31), so that the inlet waterway (10) is switched to connect to the first outlet waterway (20) or the second outlet waterway (30).

In another preferred embodiment, the first outlet (21) and the second outlet (31) are spaced up and down along the inlet waterway (10), the slim hole (110) and the control hole (40) are spaced up and down along the inlet waterway (10), the diameter of the slim hole (110) is smaller than the diameter of the control hole (40).

In another preferred embodiment, the valve spool (100) comprising a spool body (120) with an internal cavity, the external periphery of the spool body (120) is disposed with a first protruding sealing ring (121) and a second protruding sealing ring (122) respectively to close the first outlet (21) and the second outlet (31), the external periphery of the spool body (120) is further disposed with a water hole (123) between the two protruding sealing rings, the spool body (120) is disposed with a baffle (124) below the water hole (123), the baffle (124) divides the internal cavity into an upper cavity (125) and a lower cavity (126), the slim hole (110) runs through the baffle (124), the upper cavity (125) is connected to the inlet cavity (10), the lower cavity (126) and the fixed portion form the pressure cavity (50).

In another preferred embodiment, it further comprising a button mechanism applied with automatic pencil switch principle, the button mechanism is assembled to the fixed portion, and comprises a button (310), a pushing rod (320) connected to the button (310) in driving way, a plug (330) connected to the pushing rod (320) in driving way to open or close the control hole (40) and a restoring spring (340).

In another preferred embodiment, the fixed portion comprising a valve housing and a valve body fixed inside the valve housing, the inlet waterway (10) and the two outlet waterways are disposed in the valve housing and the first outlet waterway (20) is disposed at the side portion (850) of the valve housing, the second outlet waterway (30) is parallel to the inlet waterway (10), the first outlet (21) and the second outlet (31) are disposed at the side portion (860) of the valve body and are respectively corresponding to the first outlet waterway (20) and the second outlet waterway (30), the control hole (40) is disposed at the bottom (870) of the valve body, the valve spool (100) is slidably assembled inside the valve body, the valve spool and the valve body form the pressure cavity (50).

A second technical proposal of the present invention to solve the technical problem is as below:

A combined shower applied with the pilot valve switch mechanism comprising a first outlet terminal, a second outlet terminal and a pilot valve switch mechanism, the first outlet terminal and the second outlet terminal are respectively disposed with a corresponding first outlet cavity and a corresponding second outlet cavity, the pilot valve switch mechanism is applied in the first outlet terminal, the first outlet waterway and the second outlet waterway are respectively connected to the first outlet cavity and the second outlet cavity.

In another preferred embodiment, the first outlet terminal is a head shower (500), the second outlet terminal is a hand shower (600), the head shower (500) comprising a main section (510) and a supporting section (520), the first outlet cavity is disposed in the main section (510), the pilot valve switch mechanism is assembled to the main section (510), the main section (510) is connected to the hand shower (600) by a flexible pipe (60).

In another preferred embodiment, the hand shower (600) comprising a body section (610) and a handle section (620), the supporting section (520) of the head shower (500) is disposed with a first magnet (521), the back side of the body section (610) is disposed with a second magnet (611), with the cooperation of the first magnet (521) and the second magnet (611), the hand shower (600) is detachably assembled to the head shower (500).

In another preferred embodiment, the first outlet terminal is a head shower (500), the second outlet terminal is a side sprayer (700), the head shower (500) comprising a main section (510) and a supporting section (520), the first outlet cavity is disposed in the main section (510), the pilot valve switch mechanism is assembled to the supporting section (520), the supporting section (520) is connected to the side sprayer (700) by a flexible pipe (60).

Compared to the existing technology, the technical proposal of the present invention has advantages as below:

pressing the button, the pushing rod drives the plug to open the control hole, as the diameter of the slim hole is smaller than that of the control hole, the water inside the pressure cavity discharging out of the control hole is larger than the water charging in from the slim hole, so that the water pressure inside the pressure cavity is small, as the area of the first pressed area is almost equal to that of the second pressed area, the water pressure of the first pressed area is far smaller than the water pressure of the second pressed area, although the this pressed area is pressed with same high pressure as the second pressed area, as it is small area, the pressure of the second pressed area holds a leading work, thus pushing the valve spool down along the inlet waterway, meanwhile, the first protruding sealing ring closes the first outlet, the second protruding sealing ring opens the second outlet, water flows to the upper cavity from the inlet waterway then into the second outlet waterway from the second outlet through the water hole, then flows out of the connected second outlet terminal from the second outlet waterway, the second outlet terminal is discharging water, the first outlet terminal is closed.

pressing the button, the pushing rod drives the plug to close the control hole, the pressure cavity can not discharge water out by the control hole, the pressure inside the pressure cavity is equal to the pressure outside, that is to say, the pressure of the first pressed area is similar to that of the second pressed area, they are balanced, as the third pressed area is pressed by more water pressure, the pressured of the third pressed area holds a leading work, thus pushing the valve spool up along the inlet waterway, the first protruding sealing ring opens the first outlet, the second protruding sealing ring closes the second outlet, water flows to the upper cavity from the inlet waterway then into the first outlet waterway from the first outlet through the water hole, then flows out of the connected first outlet terminal from the first outlet waterway, the first outlet terminal is discharging water, the second outlet terminal is closed.

The pilot valve switch mechanism utilizes the control hole to switch the waterways, which prevents the main pipe from great water pressure, the diameter of the control hole can be smaller, so that the water pressure of the button mechanism can be ignored, only friction and light elastic force of the spring exist, it is provided with small operation force and is stable, which enhance the switch handle feeling.

BRIEF DESCRIPTION OF THE DRAWINGS

The present invention will be further described with the drawings and the embodiments.

DETAILED DESCRIPTION OF THE EMBODIMENTS

Please refer to FIG. 1 to FIG. 6, a combined shower of the first embodiment comprising a first outlet terminal, a second outlet terminal and a pilot valve switch mechanism.

The first outlet terminal is disposed with a first outlet cavity corresponding to a functional water type, the pilot valve switch mechanism is applied in the first outlet terminal. In this embodiment, the first outlet terminal is a head shower 500, which comprises a main section 510 and a supporting section 520, the main section 510 is disposed with the first outlet cavity, the pilot valve switch mechanism is assembled to the main section 510. in this embodiment, the supporting section 520 of the head shower 500 is disposed with a first magnet 521.

The second outlet terminal is disposed with a second outlet cavity corresponding to a functional water type. In this embodiment, the second outlet terminal is a hand shower 600, which comprises a body section 610 and a handle section 620, the main section 510 is connected to the handle section 620 by a flexible pipe 60. in this embodiment, the back side of the body section is disposed with a second magnet 611, with the first magnet 521 and the second magnet 611, the hand shower 600 is detachable to assemble to the head shower 500.

Figure 6:
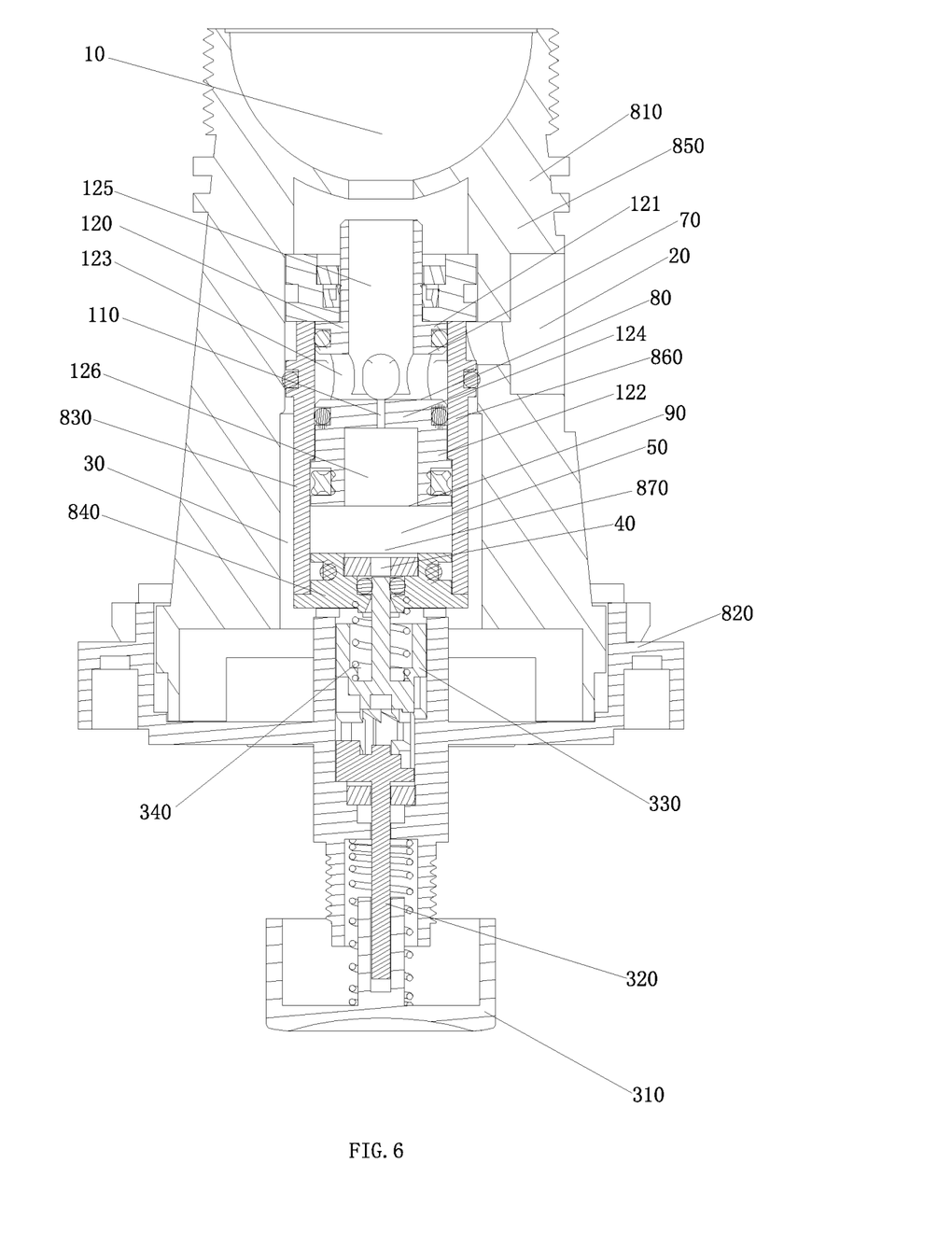
FIG. 6 illustrates a sectional view of the pilot valve switch mechanism of the first embodiment.

The pilot valve switch mechanism comprising a fixed portion and a valve spool 100.

The fixed portion is disposed with an inlet waterway 10, a first outlet waterway 20, a second outlet waterway 30 and a control hole 40 to connect to the first outlet waterway 20 or the second outlet waterway 30, the first outlet waterway 20 is disposed with a first outlet 21, the second outlet waterway 30 is disposed with a second outlet, the first outlet waterway and the second outlet waterway are respectively connected to the first outlet cavity and the second outlet cavity.

In this embodiment, the fixed portion comprising a valve housing and a valve body.

The valve housing comprising an upper valve housing 810 and a fixed base 820 fixed to the bottom of the upper valve housing 810. the inlet waterway 10 and the two outlet waterways are disposed in the upper valve housing 810, and the first outlet waterway 20 is disposed in one side of the upper valve housing 810, the second outlet waterway 30 is parallel to the inlet waterway 10, the first outlet 21 and the second outlet 31 are spaced up and down arranged along the inlet waterway 10, the first outlet waterway 20 is between the inlet waterway 10 and the second outlet waterway 30.

The valve body is fixed inside the second outlet waterway 30 of the valve housing. The valve body comprises a valve wall 830 and a base 840 fixed to the bottom of the valve wall 830, the first outlet 21 and the second outlet 31 are disposed in the valve wall 830 and are respectively corresponding to the first outlet waterway 20 and the second outlet waterway, the control hole 40 runs through the base 840.

The valve spool 100 is slidably assembled inside the fixed portion along the inlet waterway 10, the valve spool 100 is disposed with a slim hole 110 connected to the inlet waterway 10, the slim hole 110 and the fixed portion form a pressure cavity 50, the control hole 40 and the slim hole 110 are connected to the pressure cavity 50. in this embodiment, the slim hole 110 and the control hole 40 are spaced up and down arranged, the diameter of the slim hole 110 is smaller than that of the control hole 40.

By opening or closing the control hole 40, the water pressure of the pressure cavity 50 is controlled to drive the valve spool 100 to move along the inlet waterway 10 to alternately close the first outlet 21 and the second outlet 31, so that the inlet waterway 10 is switched to connect to the first outlet waterway 20 or the second outlet waterway 30.

In this embodiment, the valve spool 100 is slidably assembled inside the valve body along the inlet waterway 10, the valve spool 100 comprising a spool body 120 with an internal cavity, the external periphery of the spool body 120 is disposed with a first protruding sealing ring 121 and a second protruding sealing ring 122 respectively to close or open the first outlet 21 and the second outlet 31. the external periphery of the spool body 120 is further disposed with a water hole 123 between the two protruding sealing ring, the spool body 120 is disposed with a baffle 124 below the water hole 123, the baffle 124 divides the internal cavity to an upper cavity 125 and a lower cavity 126, the slim hole 110 runs through the baffle 124, the upper cavity 125 is connected to the inlet waterway 10, the lower cavity 126, the valve wall 830 and the base 840 form the pressure cavity 50.

In this embodiment, the pilot valve switch mechanism further comprising a button mechanism applied with automatic pencil switch principle, the button mechanism is assembled to the fixed portion and is disposed with a button 310, a pushing rod 320 driving the button 310, a plug 330 to open or close the control hole 40 and a restoring spring 340, the plug 330 is connected to the pushing rod 320 in driving way. The button mechanism cyclically opens and closes the control hole 40. As the button mechanism is existing technology, it won't be described here.

Figure 1:
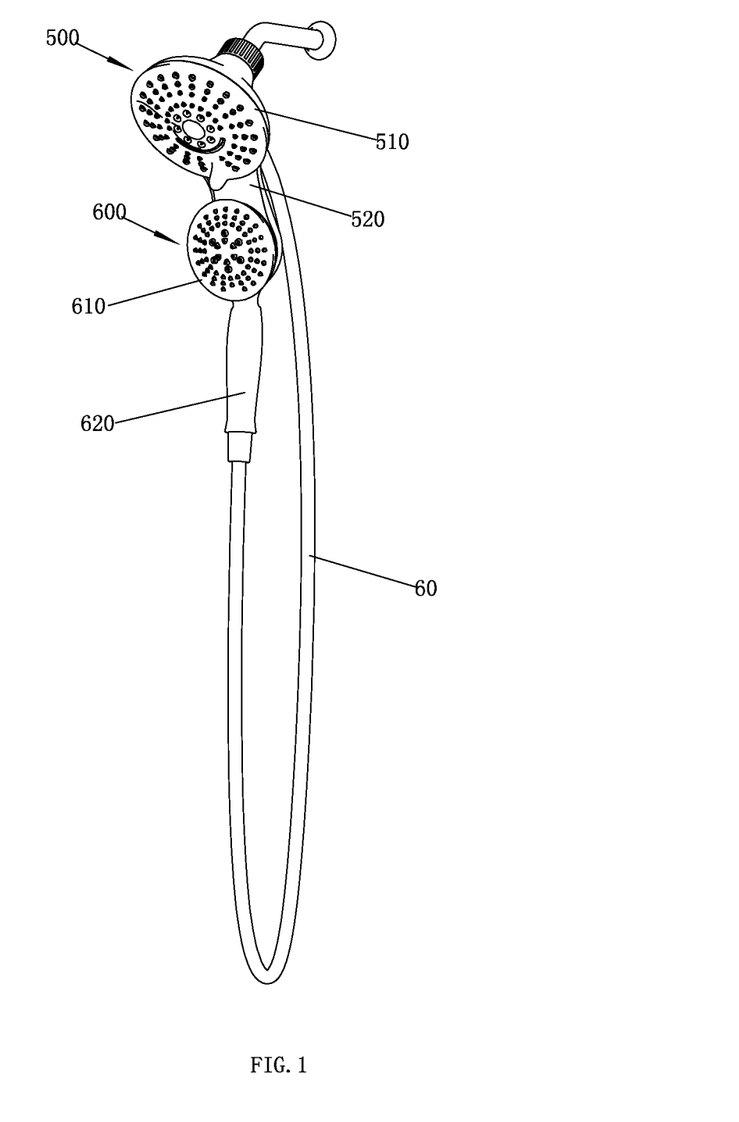
FIG. 1 illustrates a schematic diagram of a combined shower of the first embodiment.
Figure 2:
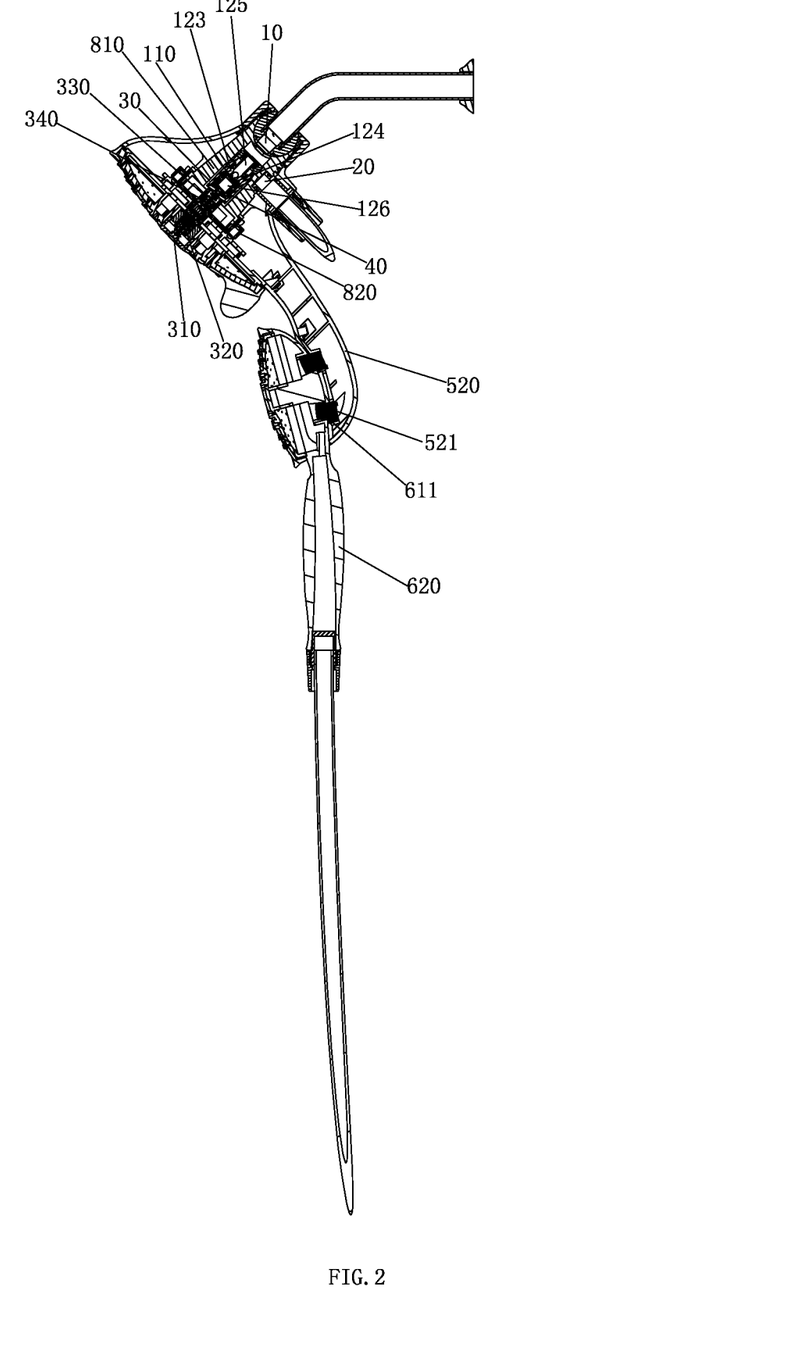
FIG. 2 illustrates a sectional view of a combined shower of the first embodiment.
Figure 3:
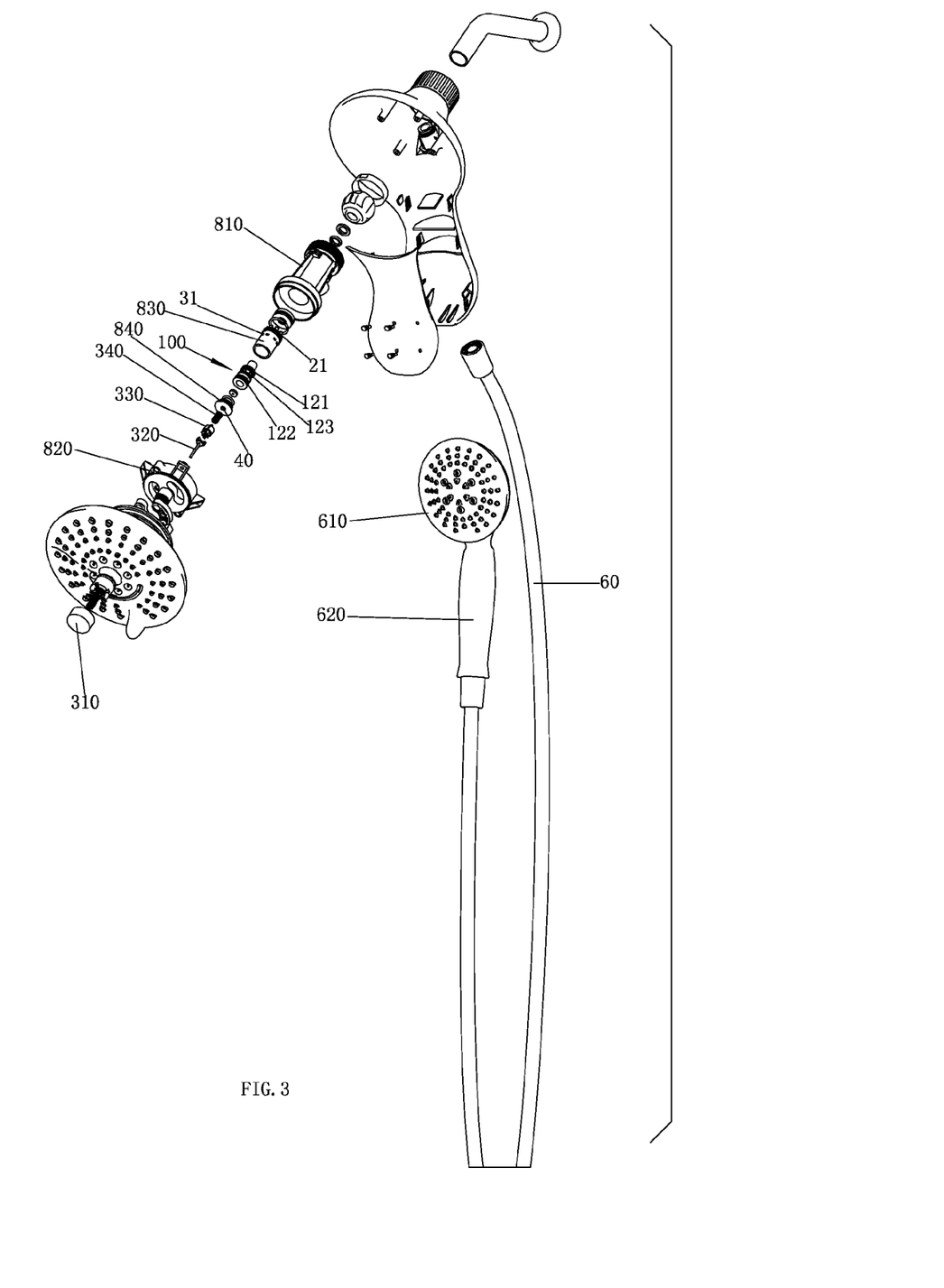
FIG. 3 illustrates an exploded diagram of a combined shower of the first embodiment.
Figure 4:
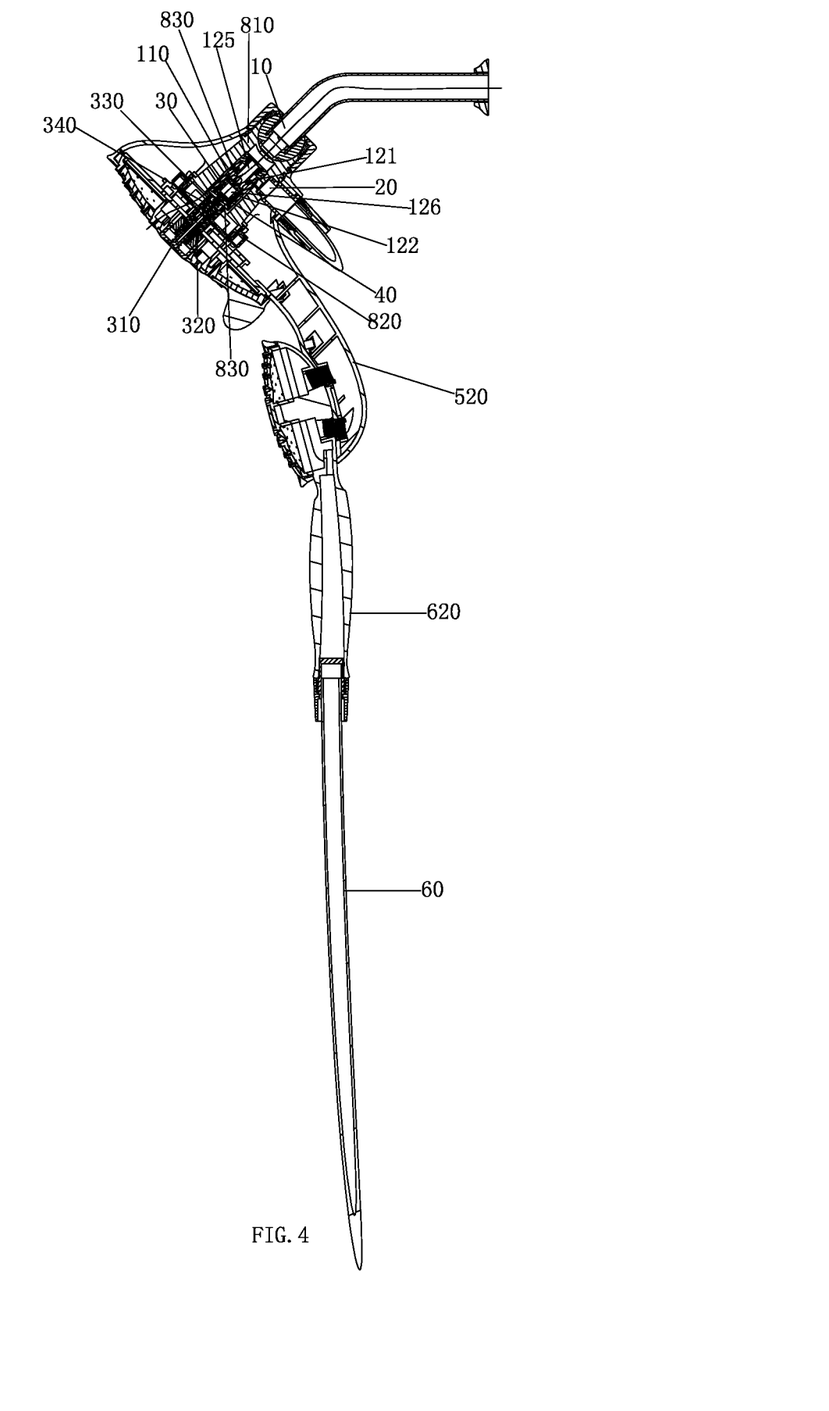
FIG. 4 illustrates a sectional view of a combined shower of the first embodiment when water flows out of the head shower.

The working principle is:

As figured in FIG. 4, pressing the button, the pushing rod 320 drives the plug 330 to open the control hole 40, as the diameter of the slim hole 110 is smaller than that of the control hole 40, the water inside the pressure cavity 50 discharging out of the control hole 40 is larger than the water charging in from the slim hole 110, so that the water pressure inside the pressure cavity 50 is small, as the area of the first pressed area 90 is almost equal to that of the second pressed area 80, the water pressure of the first pressed area 90 is far smaller than the water pressure of the second pressed area 80, although the this pressed area 70 is pressed with same high pressure as the second pressed area 80, as it is small area, the pressure of the second pressed area 80 holds a leading work, thus pushing the valve spool 100 down along the inlet waterway, meanwhile, the first protruding sealing ring 121 closes the first outlet 21, the second protruding sealing ring 122 opens the second outlet 31, water flows to the upper cavity 125 from the inlet waterway 10 then into the second outlet waterway 30 from the second outlet 31 through the water hole 123, then flows out of the connected second outlet terminal from the second outlet waterway 30, the second outlet terminal is discharging water, the first outlet terminal is closed.

Figure 5:
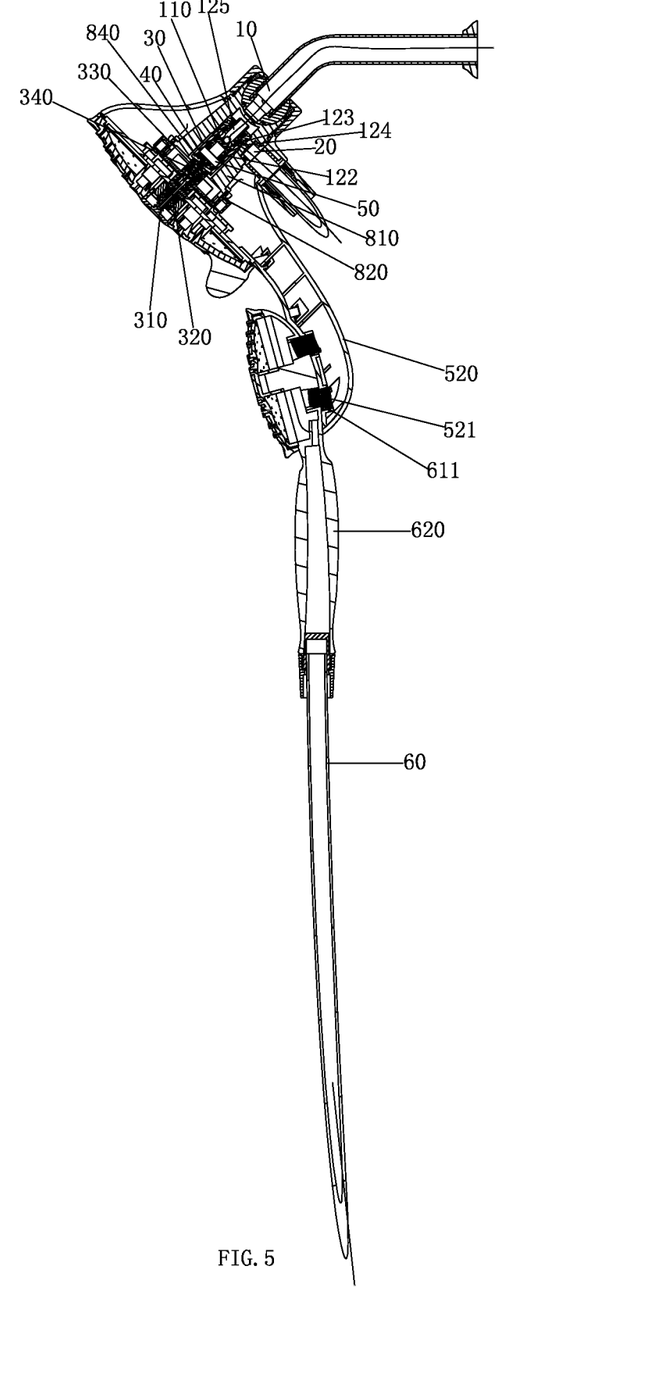
FIG. 5 illustrates a sectional view of a combined shower of the first embodiment when water flows out of the hand shower.

As figured in FIG. 5, pressing the button 310, the pushing rod 320 drives the plug 330 to close the control hole 40, the pressure cavity 50 can not discharge water out by the control hole, the pressure inside the pressure cavity 50 is equal to the pressure outside, that is to say, the pressure of the first pressed area 90 is similar to that of the second pressed area 80, they are balanced, as the third pressed area 70 is pressed by more water pressure, the pressured of the third pressed area 70 holds a leading work, thus pushing the valve spool 100 up along the inlet waterway 10, the first protruding sealing ring 121 opens the first outlet 21, the second protruding sealing ring 122 closes the second outlet 31, water flows to the upper cavity 125 from the inlet waterway 10 then into the first outlet waterway 20 from the first outlet 21 through the water hole 123, then flows out of the connected first outlet terminal from the first outlet waterway 20, the first outlet terminal is discharging water, the second outlet terminal is closed.

The pilot valve switch mechanism utilizes the control hole to switch the waterways, which prevents the main pipe from great water pressure, the diameter of the control hole can be smaller, so that the water pressure of the button mechanism can be ignored, only friction and light elastic force of the spring exist, it is provided with small operation force and is stable, which enhance the switch handle feeling.

Figure 7:
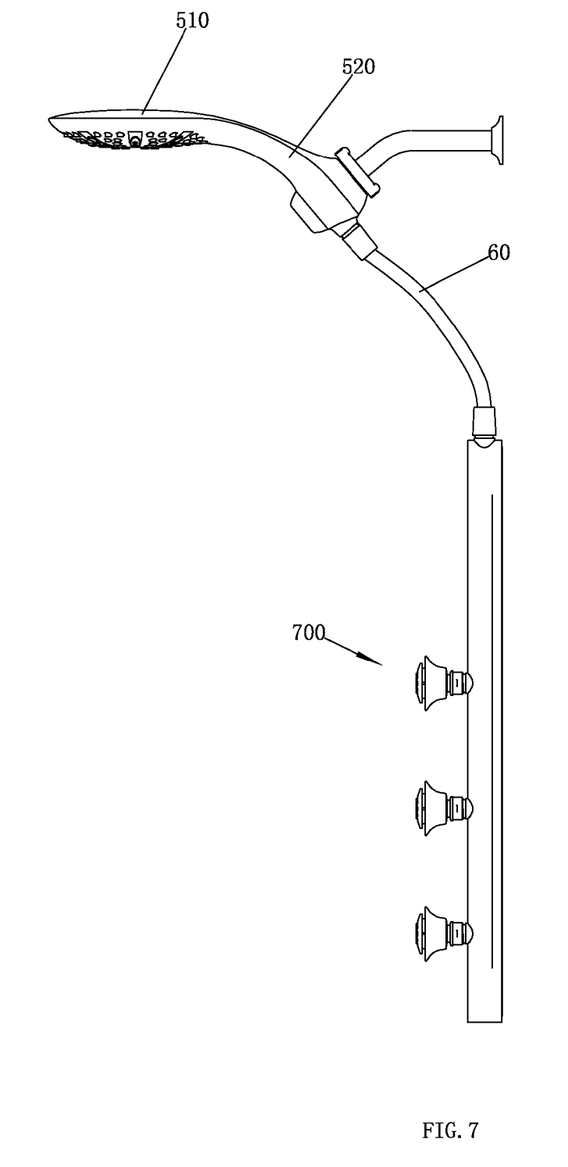
FIG. 7 illustrates a side view of a combined shower of the second embodiment.
Figure 8:
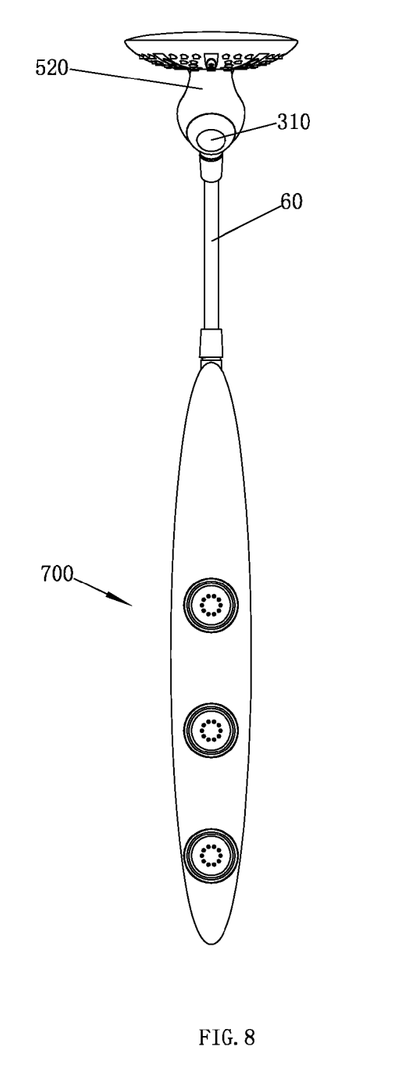
FIG. 8 illustrates a front view of a combined shower of the second embodiment.

As figured in FIG. 7 and FIG. 8, a combined shower of the second embodiment is provided.

The difference of this embodiment from the first embodiment is that:

The first outlet terminal is a head shower 500, the second outlet terminal is a side sprayer 700, the head shower 500 comprising a main section 510 and a supporting section 520, the first outlet cavity is disposed in the main section, the pilot valve switch mechanism is assembled to the supporting section 520, the supporting section 520 is connected to the side sprayer 700 by a flexible pipe 60.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A pilot valve switch mechanism, wherein comprising:
   a fixed portion, which is disposed with an inlet waterway (10),
   a first outlet waterway (20),
   a second outlet waterway (30) and
   a control hole (40) capable to connect to the outlet waterways (20, 30),
   the first outlet waterway (20) is disposed with a first outlet (21),
   the second outlet waterway (30) is disposed with a second outlet (31);
   a valve spool (100) is slidably assembled inside the fixed portion along the inlet waterway (10), the valve spool (100) is disposed with a slim hole (110) connected to the inlet waterway (10),
   the valve spool (100) and the fixed portion form a pressure cavity (50), and
   the control hole (40) and the slim hole (110) are connected to the pressure cavity (50);
   the slim hole (110) and the control hole (40) are coaxially aligned with each other,
   wherein, by opening or closing the control hole (40), a water pressure of the pressure cavity (50) is controlled to drive the valve spool (100) to move along the inlet waterway (10) to alternately close the first outlet (21) or the second outlet (31), so that the inlet waterway (10) is switched to connect to the first outlet waterway (20) or the second outlet waterway (30).

2. The pilot valve switch mechanism according to claim 1, wherein
   the first outlet (21) and the second outlet (31) are spaced up and down along the inlet waterway (10),
   the diameter of the slim hole (110) is smaller than the diameter of the control hole (40).

3. The pilot valve switch mechanism according to claim 1, wherein
   the valve spool (100) comprising a spool body (120) with an internal cavity,
   an external periphery of the spool body (120) is disposed with a first protruding sealing ring (121) and a second protruding sealing ring (122) respectively to close the first outlet (21) and the second outlet (31), the external periphery of the spool body (120) is further disposed with a water hole (123) between the two protruding sealing rings, the spool body (120) is disposed with a baffle (124) on a side of the water hole (123) opposing the first protruding sealing ring, the baffle (124) divides the internal cavity into an upper cavity (125) and a lower cavity (126), the slim hole (110) runs through the baffle (124), the upper cavity (125) is connected to the inlet cavity (10), and the lower cavity (126) and the fixed portion form the pressure cavity (50).

4. The pilot valve switch mechanism according to claim 1, further comprising a button mechanism assembled to the fixed portion, including a button (310), a pushing rod (320) connected to drive the button (310), and a plug (330) connected to drive the pushing rod (320) to open or close the control hole (40) and a restoring spring (340).

5. The pilot valve switch mechanism according to claim 1, wherein the fixed portion comprising a valve housing and a valve body fixed inside the valve housing, the inlet waterway (10) and the two outlet waterways are disposed in the valve housing and the first outlet waterway (20) is disposed at a side portion of the valve housing, and the second outlet waterway (30) is parallel to the inlet waterway (10), the first outlet (21) and the second outlet (31) are disposed at a side portion of the valve body and are respectively corresponding to the first outlet waterway (20) and the second outlet waterway (30), the control hole (40) is disposed at a bottom of the valve body, the valve spool (100) is slidably assembled inside the valve body, the valve spool and the valve body form the pressure cavity (50).

6. A combined shower applied with the pilot valve switch mechanism according to claim 1, wherein comprising a first outlet terminal, a second outlet terminal and a pilot valve switch mechanism, the first outlet terminal and the second outlet terminal are respectively disposed with a corresponding first outlet cavity and a corresponding second outlet cavity, the pilot valve switch mechanism is applied in the first outlet terminal, the first outlet waterway and the second outlet waterway are respectively connected to the first outlet cavity and the second outlet cavity.

7. The combined shower with the pilot valve switch mechanism according to claim 6, wherein the first outlet terminal is a head shower (500), the second outlet terminal is a hand shower (600), the head shower (500) comprising a main section (510) and a supporting section (520), the first outlet cavity is disposed in the main section (510), the pilot valve switch mechanism is assembled to the main section (510), the main section (510) is connected to the hand shower (600) by a flexible pipe (60).

8. The combined shower with the pilot valve switch mechanism according to claim 7, wherein the hand shower (600) comprising a body section (610) and a handle section (620), the supporting section (520) of the head shower (500) is disposed with a first magnet (521), a back side of the body section (610) is disposed with a second magnet (611), with the cooperation of the first magnet (521) and the second magnet (611), the hand shower (600) is detachably assembled to the head shower (500).

9. The combined shower with the pilot valve switch mechanism according to claim 6, wherein the first outlet terminal is a head shower (500), the second outlet terminal is a side sprayer (700), the head shower (500) comprising a main section (510) and a supporting section (520), the first outlet cavity is disposed in the main section (510), the pilot valve switch mechanism is assembled to the supporting section (520), the supporting section (520) is connected to the side sprayer (700) by a flexible pipe (60).

* * * * *